United States Patent
Gharabegian (10) Patent No.: US 10,617,183 B2
(45) Date of Patent: Apr. 14, 2020

(54) METHODS AND APPARATUS FOR ADJUSTING SHADING ELEMENT AND/OR MOVING UMBRELLA ASSEMBLY TO MAXIMIZE SHADING AREA

(71) Applicant: Shadecraft, Inc., Pasadena, CA (US)

(72) Inventor: Armen Sevada Gharabegian, Glendale, CA (US)

(73) Assignee: Shadecraft, Inc., Pasadena, CA (US)

( * ) Notice: Subject to any disclaimer, the term of this patent is extended or adjusted under 35 U.S.C. 154(b) by 20 days.

(21) Appl. No.: 15/881,993

(22) Filed: Jan. 29, 2018

(65) Prior Publication Data

US 2018/0332935 A1    Nov. 22, 2018

Related U.S. Application Data

(60) Provisional application No. 62/509,636, filed on May 22, 2017.

(51) Int. Cl.
| | |
|---|---|
| *A45B 23/00* | (2006.01) |
| *A45B 17/00* | (2006.01) |
| *G05B 15/02* | (2006.01) |
| *G01S 19/13* | (2010.01) |

(52) U.S. Cl.
CPC ........... *A45B 23/00* (2013.01); *A45B 17/00* (2013.01); *A45B 2023/0006* (2013.01); *A45B 2200/1009* (2013.01); *G01S 19/13* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 7,631,653 | B2 * | 12/2009 | Young | A45B 17/00 135/15.1 |
| 8,413,671 | B2 * | 4/2013 | Li | A45B 23/00 135/16 |
| 9,839,267 | B1 * | 12/2017 | Gharabegian | A45B 25/16 |
| 9,951,541 | B1 * | 4/2018 | Gharabegian | A45B 23/00 |
| 2004/0134526 | A1 * | 7/2004 | Freedman | A45B 11/00 135/20.3 |
| 2007/0126208 | A1 * | 6/2007 | Freedman | A45B 11/00 280/647 |

(Continued)

*Primary Examiner* — David R Dunn
*Assistant Examiner* — Danielle Jackson (57) ABSTRACT

A robotic umbrella, comprising a base assembly, a support assembly coupled to the base assembly, one or more shading assemblies coupled to the support assembly, one or more processors and one or more memory devices. The robotic umbrella comprises computer-readable instructions stored in the one or more memory devices, accessed from the one or more memory devices which are executed by the one or more processors to: a) determine a geographical location of the robotic umbrella utilizing at least one of a wireless communication transceiver or a global positioning system (GPS) transceiver, or a combination thereof; and b) determine an orientation of a light source with respect to the robotic umbrella utilizing at least one of a compass, an accelerometer, a magnetometer or a gyroscope, or combination thereof. The robotic umbrella further comprises one or more distance sensors to calculate a distance from the robotic umbrella to the object.

14 Claims, 3 Drawing Sheets

(56) References Cited

U.S. PATENT DOCUMENTS

| | | | | |
|---|---|---|---|---|
| 2009/0314319 | A1* | 12/2009 | Young | A45B 11/00 135/16 |
| 2012/0097202 | A1* | 4/2012 | Chen | A45B 11/00 135/96 |
| 2014/0041555 | A1* | 2/2014 | Ramberg | F16M 13/022 108/50.12 |
| 2015/0100245 | A1* | 4/2015 | Huang | A61B 5/0022 702/19 |
| 2017/0314289 | A1* | 11/2017 | Kapur | E04H 15/28 |
| 2017/0318919 | A1* | 11/2017 | Gharabegian | A45B 25/00 |
| 2018/0186433 | A1* | 7/2018 | Gharabegian | B63B 17/02 |
| 2018/0187447 | A1* | 7/2018 | Gharabegian | F21V 33/0004 |
| 2018/0192776 | A1* | 7/2018 | Scrone-Smith | A47C 7/66 |
| 2018/0315271 | A1* | 11/2018 | Gharabegian | G07F 9/10 |
| 2019/0069652 | A1* | 3/2019 | Rosedale | A45B 23/00 |
| 2019/0078347 | A1* | 3/2019 | Gharabegian | E04H 15/02 |
| 2019/0087878 | A1* | 3/2019 | Gharabegian | A45B 25/165 |

* cited by examiner

METHODS AND APPARATUS FOR ADJUSTING SHADING ELEMENT AND/OR MOVING UMBRELLA ASSEMBLY TO MAXIMIZE SHADING AREA

RELATED APPLICATIONS

This application claims priority to U.S. provisional patent application Ser. No. 62/509,636, filed May 22, 2017, entitled "METHODS AND APPARATUS FOR ADJUSTING SHADING ELEMENT AND/OR MOVING UMBRELLA ASSEMBLY TO MAXIMIZE SHADING AREA," the disclosure of which is hereby incorporated by reference.

BACKGROUND

Field

This application is directed to a method and apparatus for calculating a maximum shading area for an intelligent umbrella.

Prior umbrellas utilize manual adjustment in order to provide shade to users. In the past, umbrellas could not adjust to changing conditions and/or changing environments.

DETAILED DESCRIPTION

Described herein is a process for determining a maximum shading area for a robotic shading device and/or an intelligent umbrella with respect to an object. Further, described herein is a process for moving and/or adjusting a robotic shading device or adjusting a robotic shading device to a determined location and/or orientation. Prior systems required manual adjustment of different assemblies (e.g., expansion assemblies, elevation assemblies, rotation assemblies, frame assemblies, etc.) in order to shade users of umbrellas and/or parasols. Described herein is an automatic process that determines best positions and orientations of umbrellas, parasols and robotic shading systems based on a number of variables, but not limited to, location of the sun as determined by sensors, geographic location and orientation of the shading system or umbrella, and mechanical configurations and limitations of components and/or assemblies of the umbrella and/or shading systems (e.g., number of actuators, length of arms/blades, rotational limitations of hinges or other assemblies). This allows automatic determination without having to go through a trial and error process and thus minimizing time and effort to find an optimal shading solution.

Figure 1:
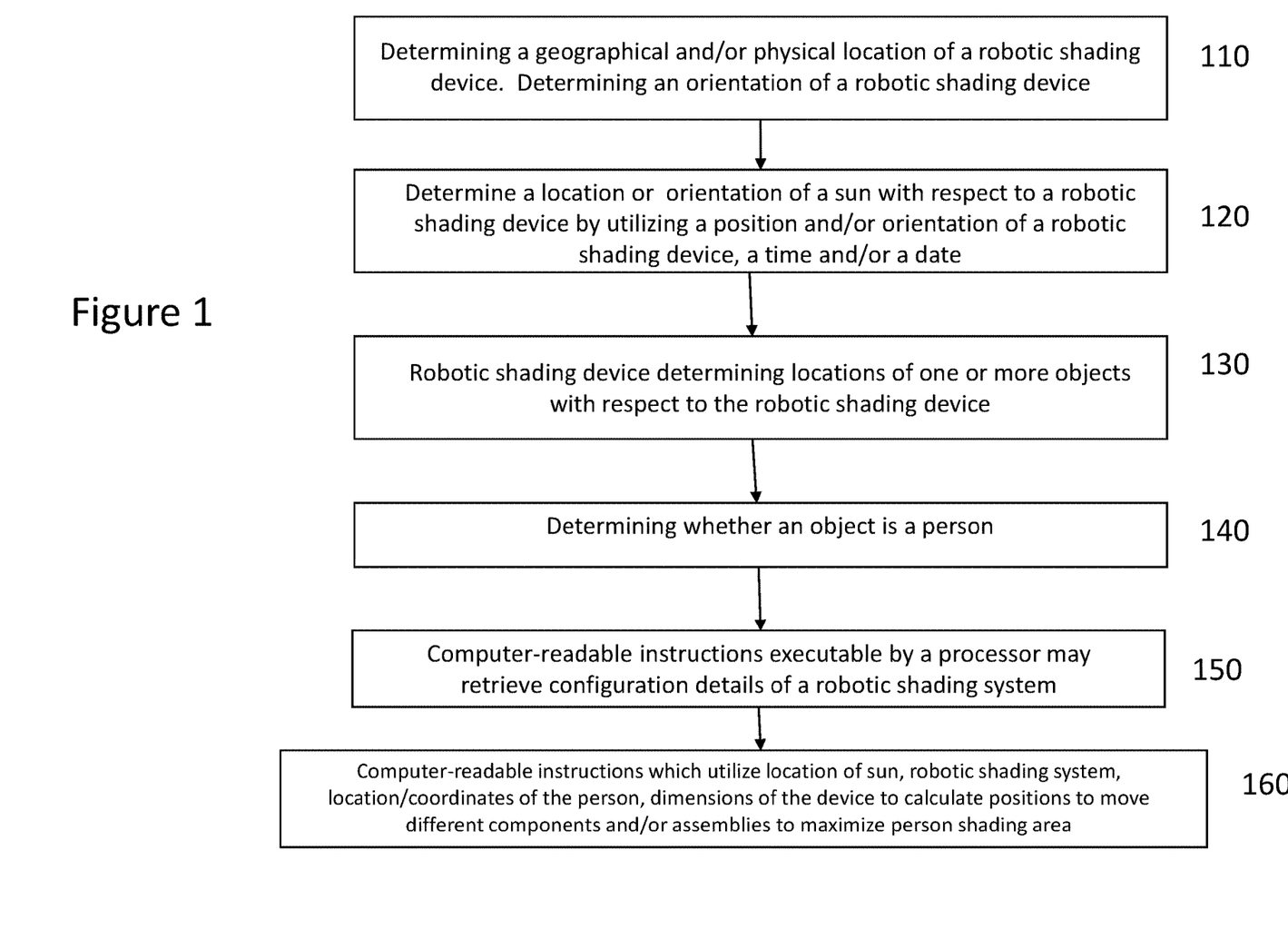
FIG. 1 illustrates a process and/or method of determining a maximum shading area for an intelligent umbrella or robotic shading system according to embodiments.

FIG. 1 illustrates a process and/or method of determining a maximum shading area for an intelligent umbrella or robotic shading system according to embodiments. In embodiments, computer-readable instructions executable by one or more processors of one or more computing devices may determine a physical and/or geographical location of a robotic shading system and/or intelligent umbrella. In embodiments, step 110 of a process comprises determining a geographical and/or physical location of a robotic shading device and/or intelligent umbrella. In addition, step 110 further comprises determining an orientation of a robotic shading device and/or intelligent umbrella. In embodiments, computer-readable instructions stored in one or more memory devices of a mobile computing device, may be accessed and executed by one or more processors and may retrieve a geographical and/or physical location measurement for an intelligent umbrella and/or robotic shading system from one or more memory devices in an intelligent umbrella and/or robotic shading device or system. In embodiments, computer-readable instructions stored in one or more memory devices of a mobile computing device, may be accessed and executed by one or more processors and may retrieve an orientation measurement and/or value for an intelligent umbrella and/or robotic shading system from one or more memory devices in an intelligent umbrella and/or robotic shading device or system.

In embodiments, when a geographical and/or physical location measurement or an orientation is not stored in one or more memory devices of an intelligent umbrella and/or robotic shading system, the geographical and/or physical location measurement or orientation value may need to be obtained utilizing components of an intelligent umbrella and/or robotic shading system and/or mobile computing device. In embodiments, a geographic and/or physical location measurement may be captured utilizing one or more of GPS receivers and one or more compass devices (e.g., digital compass) integrated within an intelligent umbrella and/or robotic shading system. In embodiments, a geographic and/or physical location measurement may be captured, based at least in part, on measurements and parameters captured and/or obtained via one or more WiFi or 802.11 transceivers, and/or one or more cellular transceivers and/or one or more personal area network transceivers. In embodiments, computer-readable instructions executable by one or more processors of one or more computing devices may calculate a geographic and/or physical location measurement based on wireless communication transceiver readings utilizing trilateration algorithms and/or triangulation algorithms. In embodiments, wireless transceiver readings may be operated on utilizing received signal strength indication (RSSI), fingerprinting, angle of arrival (AoA) and time of flight (ToF) based techniques. In embodiments, an intelligent shading device and/or a robotic shading system orientation (or intelligent shading device orientation) may also be captured and/or calculated utilizing one or more gyroscopes, magnetometers, compasses and/or accelerometers. In embodiments, a robotic shading device or intelligent shading device may have one or more gyroscopes, magnetometers, compasses and/or accelerometers integrated within a body or housing of the robotic shading system and intelligent umbrella and/or a similarly located mobile computing device. In embodiments, algorithms discussed previously may also determine and/or calculate an orientation of an intelligent umbrella and/or robotic shading system. In embodiments, an orientation of a device (e.g., an umbrella) may be a measurement or value or degree of a device with respect to a reference point and/or reference direction (e.g., true north).

Determine Location of Sun Relative to Robotic Shading Device—In embodiments, computer-readable instructions executable by one or more processors of one or more mobile computing devices may determine a location of a light source (e.g., the sun) relative to a robotic shading device, intelligent umbrella and/or robotic shading system. In embodiments, step 120 may comprise retrieving and/or capturing a current time and/or a current date. In embodiments, an intelligent umbrella and/or robotic shading system may comprise a clock and computer-readable instructions executable by one or more processors in one or more mobile computing devices may access a clock and retrieve a current time and/or current date from a clock in an intelligent umbrella and/or robotic shading system. In embodiments, computer-readable instructions executed by one or more processors processor may communicate with a clock in a mobile computing device to obtain a time and/or date. In embodiments, an external device (e.g., server computing device) may have a clock or another device that may provide a current time and/or current day. In embodiments, computer-readable instructions executable by one or more processors of one or more mobile computing devices may communicate with an external computing device (e.g., server device) to obtain a current date and/or a current time from the external server computing device. In embodiments, computer-readable instructions executed by one or more processors of one or more mobile computing devices may determine a location and/or orientation of a sun with respect to a robotic shading device by utilizing a) a geographical position or geographical location of an intelligent umbrella and/or robotic shading system; b) an orientation of an intelligent umbrella and/or robotic shading device, c) a time and/or d) date.

Determine Location of Object with Respect to Robotic Shading Device—In embodiments, computer-readable instructions executable by one or more processors of one or more computing devices may communicate with other components of an intelligent umbrella or robotic shading system to determine a location of an object (e.g., an operator, another living organism and/or a piece of outdoor furniture (lounge chair, table, etc.) with respect to a robotic shading system or intelligent umbrella. In embodiments, step 130 comprises a robotic shading device, intelligent umbrella and/or robotic shading system determining locations of one or more objects with respect to the robotic shading device, intelligent umbrella and/or robotic shading system. In embodiments, one or more sensors (e.g., directional sensors, proximity sensor, motion sensors, or distance sensors) may determine coordinates of one or more objects with respect to the robotic shading device, intelligent umbrella and/or robotic shading system. In embodiments, one or more sensors of a robotic shading system and/or intelligent umbrella may determine and/or calculate a distance of one or more objects with respect to a robotic shading device and/or an intelligent umbrella and/or an angular displacement with respect to a reference point of a robotic shading device, intelligent umbrella and/or robotic shading system. In embodiments, one or more sensors of an intelligent umbrella and/or robotic shading system may be a proximity sensor, a capacitive sensor, optical sensors, ultrasonic sensors, directional sensors, distance sensors, sonic sensors, as well as line of sight sensors. In embodiments, one dimensional, two-dimensional or three-dimensional LIDAR may be utilized by sensors. In embodiments, one dimensional, two-dimensional or three-dimensional radio frequency waves or signals may be utilized by sensors to determine distance and angular displacement of an object from a reference point (e.g., a support assembly, a tube, a shaft, a base, or a shading element) of an intelligent umbrella and/or robotic shading system. In embodiments, sonar sensors may be utilized by sensors to determine distance and angular displacement. In embodiments, heat and/or thermal sensors may be utilized to determine distance and/or angular displacement of an object from a reference point of an intelligent umbrella and/or robotic shading system. In embodiments, a line array of microphones may capture sound waves and/or sounds emitted from an object. In embodiments, one or more microphones (e.g., in a line array of microphones) may convert sound waves into an electrical audio signal representative of sounds emitted from the object. In embodiments, computer-readable instructions executable by one or more processors may convert electrical audio signals into audio files. In embodiments, computer-readable instructions executable by one or more processors may analyze audio files to determine a distance and/or angular displacement from the object that is generating the sounds (and/or sound waves) and the intelligent umbrella and robotic shading system. In embodiments, computer-readable instructions executable by one or more processors may compare sound characteristics (e.g., amplitude and/or frequency characteristics) to known sound characteristics having known distance values or measurements. In embodiments, computer-readable instructions executable by one or more processors of one or more mobile computing devices may compare known sound degradation characteristics as a sound may captured away from a sound source to received amplitudes and/or frequencies of a sound file. In embodiments, an intelligent umbrella and/or robotic shading system may determine a location of a person's or object's mobile phone and assume this is a distance of a person from a robotic shading system. In embodiments, a distance may be determined by utilizing triangulation and/or trilateralization processes, as discussed above. In addition to distance and/or angular displacement of an object from a robotic shading system, sensors discussed above may also determine a height and/or width of an object, especially two dimensional or three-dimensional LIDAR sensors and/or laser scanners. In embodiments, one or more imaging devices of an intelligent umbrella and/or robotic shading system may capture an image of an object of interest. In embodiments, computer-readable instructions executable by one or more processors of one or more mobile computing devices may analyze an image of an object of interest in order to determine a distance and/or angular displacement of an object of interest with respect to an intelligent umbrella and/or robotic shading system.

Verify Object is a Person—In embodiments, computer-readable instructions executable by one or more processors of one or more mobile computing devices may utilize images, measurements, and/or files from one or more components (e.g., imaging devices or cameras, LIDAR or laser scanners, one or more microphones) of an intelligent umbrella or robotic shading system to determine if an object is a living organism or person. In embodiments, step 140 comprises an intelligent umbrella, robotic shading system or robotic shading device determining whether an object is a person. In embodiments, for example, an intelligent umbrella and/or robotic shading system may comprise one or more imaging devices. In embodiments, one or more imaging devices (e.g., cameras or other imaging devices) may be activated, may capture an image of an object (e.g., person) and may communicate a captured image to one or more processors in one or more mobile devices (or processors of an intelligent umbrella and/or robotic shading system). In embodiments, computer-readable instructions executable by one or more processors of the one or more mobile devices ((or processors of an intelligent umbrella and/or robotic shading system) may receive a captured image and analyze the received image to determine if an object in the captured image is a person or living organism. In embodiments, an image processing engine (e.g., software residing in one or more memory devices) may perform this comparison and/or analyzation. In embodiments, an image processing application programming interface (API) may communicate the captured image to one or more mobile computing devices for image processing and analyzation. In embodiments, computer-readable instructions executable by one or more processors of the one or more mobile devices ((or processors of an intelligent umbrella and/or robotic shading system) may receive confirmation or rejection that the captured image is a person and/or living organism. In embodiments, one or more sensors may be utilized to determine a height and/or width of an object, which may then be analyzed to determine if that height and/or width is a person. In embodiments, for example, a two-dimensional laser scanner or a LIDAR sensor may be activated, may generate and/or capture an image and/or representation of an object within a scanning field of a scanning sensor. In embodiments, a LIDAR sensor may operate by firing a light beam (e.g., a laser light) at an object and may measure (via a sensor) a time a reflected light takes to return to a source of the light beam. In embodiments, a LIDAR sensor or two-dimensional laser scanner may generate a two dimensional representation or image of an object (e.g., generate a height and/or width of an object). In embodiments, computer-readable instructions executable by one or more processors of one or more mobile computing devices (or processors of an intelligent umbrella and/or robotic shading system) may receive measurements from a LIDAR sensor or two-dimensional laser scanner and create or generate a two dimensional representation or image of the object. In embodiments, computer-readable instructions executable by one or more processors of one or more mobile computing devices (or processors of an intelligent umbrella and/or robotic shading system) may analyze the created or generated two-dimensional representation or image to determine whether it represents a human or living organism. In embodiments, computer-readable instructions executable by one or more processors may communicate the created or generated representation or image to an external computing device (e.g., a server computing device) for analyzation as to whether the received representation or image represents a human or living organism. In embodiments, the external computing device communicates the determination of whether the object is a human or living organism to the mobile computing device (and/or an intelligent umbrella and/or robotic shading system).

Determine Configuration of Robotic Shading System—In embodiments, computer-readable instructions executable by one or more processors of one or more mobile computing device may retrieve a configuration of a robotic shading system and/or an intelligent umbrella in order to determine and/or calculate a geometric reach or capability of the robotic shading system or intelligent umbrella with respect to being able to provide shade. In embodiments, step 150 may comprise computer-readable instructions executable by one or more processors of one or more mobile computing devices may retrieve configuration details of a robotic shading system or intelligent umbrella. In embodiments, intelligent umbrella and/or robotic shading system configuration information, parameters and/or details may be stored in one or more memory devices within an intelligent umbrella and/or robotic shading system and computer-readable instructions may access or retrieve the system configuration parameters from the one or more memory devices. In embodiments, intelligent umbrella and/or robotic shading system configuration information, parameters and/or details may be stored in memory devices located in external computing devices (e.g., servers or umbrella manufacturer's computing devices). In such embodiments, computer-readable instructions executable by one or more processors in one or more mobile computing devices may communicate with the external computing devices to request and/or receive the intelligent umbrella and/or robotic shading system configuration information, parameters and/or details from the external computing devices. In embodiments, intelligent umbrella and/or robotic shading system configuration information, parameters and details may be stored in one or more memory devices of one or more mobile computing devices and may be retrieved from the one or more memory devices of the mobile computing devices. In embodiments, intelligent umbrella and/or robotic shading system configuration information, parameters and/or details may include, but is not limited, number of motors, type of angular movement and/or angular rotation available (azimuth and/or elevation), availability of multiple elevation rotations, length of assemblies (e.g., support assembly, upper assembly length, lower assembly length), expansion lengths and/or rotation (for expansion assembly), lengths of blades, arms and/or spokes, umbrella design (cantilever, louver, standard upright design), shading fabric and arm blade size and/or geometry (circle, square, rectangle of shading fabric or arms/blades). In embodiments, computer-readable instructions executable by one or more processors of one or more mobile computing devices may calculate shading capabilities for different configurations of robotic shading systems or intelligent umbrellas. In embodiments, for example, computer-readable instructions executable by one or more processors of one or more mobile computing devices may calculate a shading capability (e.g., potential shading area) for an intelligent umbrella a) with an upper assembly of a support assembly in a fully vertical position or an upper assembly of a support assembly rotated 15, 30 and 45 degrees with respect to a lower assembly; and/or b) with an expansion assembly fully extended or extended 60% or 75% or 80%. In embodiments, in another example, computer-readable instructions executable by one or more processors of one or more mobile computing devices may calculate a shading capability for a robotic shading system having four support arms and a square shading fabric, a robotic shading system having four support arms and a round shading fabric and/or a robotic shading system having four support arms and a rectangular shading fabric. In embodiments, computer-readable instructions executable by one or more processors of one or more mobile computing devices may utilize a position of a light source (e.g., a sun), a geographic location of a robotic shading system and/or intelligent umbrella and/or an orientation of a robotic shading system and/or intelligent umbrella along with intelligent umbrella/shading system configuration parameters to calculate a potential shading capability for the different configurations deployments.

Generate Instructions to move components and/or assemblies to maximize shading area for person. In embodiments, computer-readable instructions executable by one or more processors of one or more mobile computing device may analyze the plurality of shading capabilities calculated for the different intelligent umbrella/robotic shading system configurations and determine a largest shading capability of the different configurations based at least in part i) on a calculated and/or determined location of an object that is to be shaded; ii) geographic location and/or orientation of intelligent umbrella/robotic shading system; iii) configuration parameters; and iv) location of a light source. For example, three shading capabilities may be calculated (1) for an intelligent umbrella having a round shading fabric; (2) an intelligent umbrella having a square shading fabric and (3) an intelligent umbrella having a rectangular shading fabric (utilizing the intelligent umbrella/robotic shading system configuration parameters, geographic location and/or orientation of intelligent umbrella/robotic shading system and location of light source) and the largest shading capability (or area) with respect to the object may be selected. In embodiments, based on those factors, a rectangular shading fabric may provide a largest shading capability (e.g., shading area) with respect to the object being shaded. In an additional example, four shading capabilities may be calculated (e.g., each having different elevation angles and azimuth angles). For example, in embodiments, step 160 may comprise computer-readable instructions executable by one or more processors of one or more mobile computing devices may utilize location of the sun, geographic location and/or orientation of the robotic shading system, location/coordinates of the person (e.g., distance from the person to the robotic shading system), and/or configuration parameters of the intelligent umbrella and/or robotic shading system to calculate one or more positions to move different components and/or assemblies in order to maximize a shading area for the object (e.g., person). In other words, the computer-readable instructions executable by one or more processors may be attempting to maximize a shade volume with respect to an object (e.g., person) that has been detected. In embodiments, computer-readable instructions executable by one or more processors of one or more mobile computing devices may then generate and/or communicate instructions, commands, messages and/or signals to the identified components and/or assemblies to move to the desired position to provide a largest shading volume.

Figure 2:
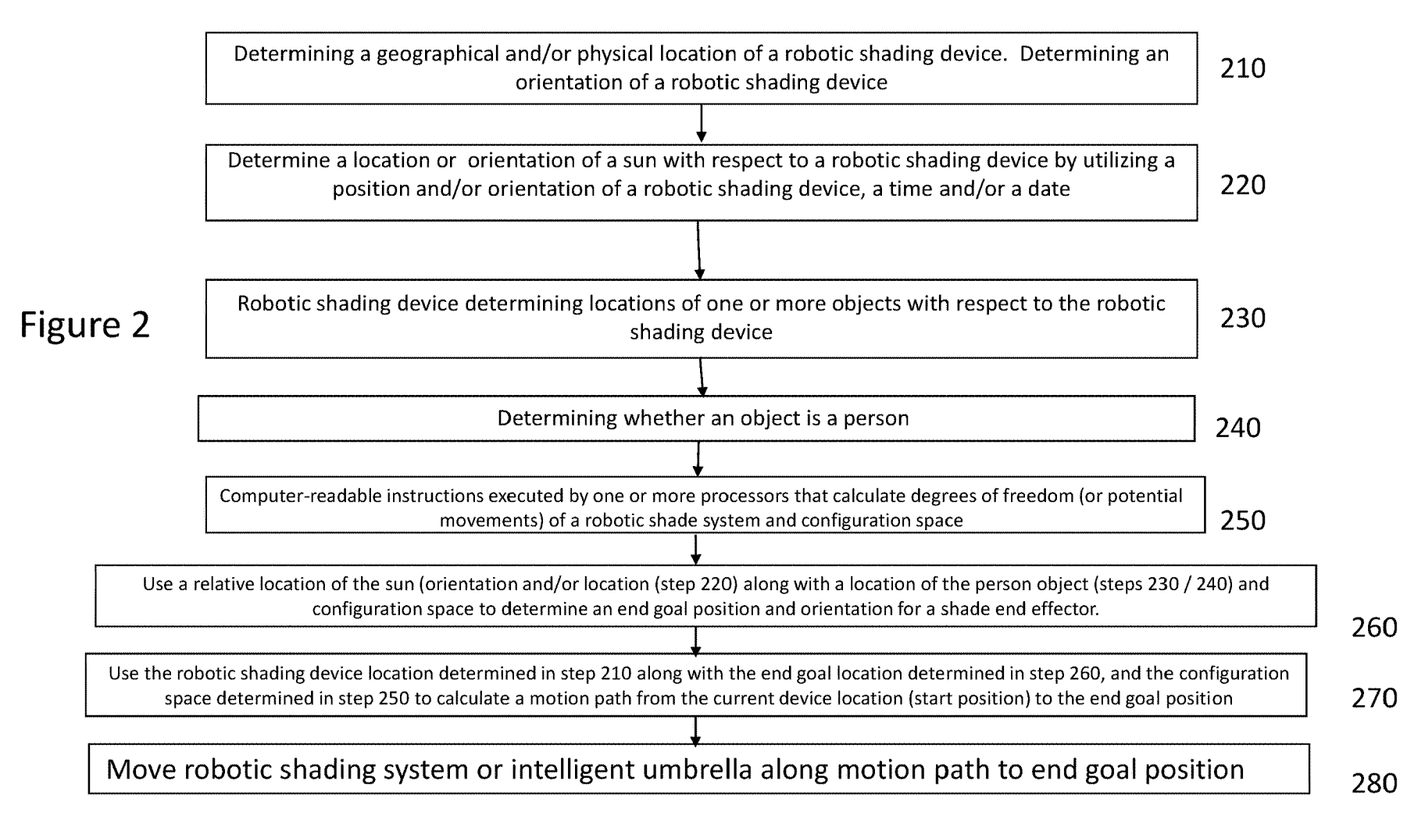
FIG. 2 illustrates a second embodiment of a process and/or method of determining a maximum shading area for an intelligent umbrella or robotic shading system according to embodiments.

FIG. 2 describes a second embodiment of a robotic shading system process according to an embodiment. Steps 210-240 are the same and/or similar to steps 110-140 described above.

In embodiments, a configuration space of an intelligent umbrella and/or robotic shade system may be determined by figuring out degrees of freedom of a robotic shade system or intelligent umbrella. In embodiments, degrees of freedom may refer to potential movements that may be made by different assemblies of an intelligent umbrella and/or robotic shading system and/or ability of intelligent umbrellas to move and/or adjust assemblies and/or major components. In embodiments, an intelligent umbrella's degree of freedom may be constrained by a number of actuators present in an umbrella (e.g., one or more rotation actuators, one or more elevation or hinging actuators, and/or one or more expansion or deployment actuators) and physical characteristics of shade end effectors. In embodiments, step 250 may comprise computer-readable instructions executed by one or more processors of a mobile computing device or of an intelligent umbrella and/or robotic shading system) may utilize degrees of freedom (or potential movements) of an intelligent umbrella and/or robotic shade system to determine potential configuration space for different positions and orientation of the intelligent umbrella and/or robotic shading system. In embodiments, degrees of freedom (or potential movements) may be calculated and/or determined based at least in part on one or more intelligent umbrella and/or robotic shading system configuration parameters or values. In embodiments, one or more intelligent umbrella and/or robotic shading system configuration parameter or values and/or degrees of freedom (or potential movements) may be stored in one or more memory devices of i) an intelligent umbrella or robotic shading system; ii) one or more mobile computing devices; iii) one or more remote computing devices (e.g., servers), or a combination thereof. In embodiments, for example, degrees of freedom (or potential movements) may be determined and/or calculated and may be based, at least in part on, (or may be constrained by) 1) a number of actuators (e.g., actuators, motors, cable and gear systems), properties of actuators, motors, cable and gear systems and/or limitations of actuators, motors, cable and gear systems; 2) dimensions and/or capabilities of shade end effectors (shading frame & fabric; shading support assemblies and arms/blades; and/or shading elements); 3) dimensions and/or capabilities of complete assemblies (e.g., angle rotation of elevation assembly (e.g., 0 to 40% rotation); length of arms or blades, arm extensions and/or arm support frames); and/or 4) length of lower and upper support assemblies that are connected to a hinging or elevation assembly. In embodiments, for example, computer-readable instructions executed by one or more processors of one or more mobile computing devices may determine potential geographical positions and/or orientations that a shade end effector may reach. In embodiments, a shade end effector may be an intelligent umbrella and/or robotic shading system including a shading frame and fabric, shading elements and fabric, one or more shading elements, and/or one or more shading arms and materials covering such shading arm. In embodiments, shading end effector positions may be positions and/or orientations from, for example, storage positions to full deployment and/or full actuation positions an intelligent umbrella and/or robotic shade system may be capable of moving to. In embodiments, computer-readable instructions executed by one or more processors of one or more mobile computing devices, may also take into consideration a presence of obstacles and/or any other barriers that may be present in an environment including a robotic shade system and/or intelligent umbrella. For example, if a table is present in an outdoor environment between a robotic shade system and a user or if a tree is present that also may provide shade, these factors may be taken into consideration. In embodiments, in addition, these barriers and/or obstacles may constrain possible movements of actuators, motors cable systems, shading frames, support assemblies, arms, blades or other components of robotic shade systems and/or intelligent umbrellas. In embodiments, computer-readable instructions executable by one or more processors of one or more mobile computing devices, may also identify presence of obstacles and/or other barriers that may constrain possible movement of the robotic shade device within a calculated configuration space and thus should be taken into consideration. In embodiments, computer-readable instructions executable by one or more processors may calculate a configuration space values and/or parameters for one or more potential end effector positions and/or orientations of an intelligent umbrella and/or robotic shading system. In embodiments, configuration space values and/or parameters may be stored in one or more memory devices of one or more mobile computing devices, an intelligent umbrella or robotic shading system, and/or a remote computing device (e.g., a server), for later retrieval and/or use.

In step 260, computer-readable instructions executable by one or more processors of a mobile computing device may utilize i) a relative location of the sun (e.g., location and/or orientation) calculated or determined in step 220, ii) a location a person or object calculated and/or determined in steps 230 and/or step 240; and/or iii) configuration space values and/or parameters for different end effector positions to calculate, generate and/or determine 260 an end position and/or an orientation of a shade end effector.

In other words, in order to maximize shade that a robotic shade system may provide to a person and/or object, computer-readable instructions executable by one or more processors of a mobile computing device (or an intelligent umbrella or robotic shading system) may calculate or determine an end position a shade end effector may be positioned at and/or oriented within order to provide a largest amount of shade for a person and/or object. As discussed above, an intelligent umbrella and/or robotic shade system may be able to move so that configuration space parameters or value may also be determined for different geographic positions to which a base assembly (and thus an intelligent umbrella and/or robotic shade system) may move. In embodiments, this may be referred to as calculating a shading vector that may connect the object or person to be shaded and the sun.

In step 270, computer-readable instructions executable by one or more processors of a mobile computing device (or an intelligent umbrella and/or robotic shading system may utilize a 1) robotic shading system location (determined, for example, in step 210); 2) an end goal location (determined, for example, in step 260); and/or a 3) configuration space (e.g., determined in step 250) to calculate a motion path from a current device location (e.g., an initial or start position) to the end goal location and/or position. In embodiments, that is a path that may connect a person and/or object and a sun source or alternatively a path that may connect a person and/or object and a shade system including a shade end effector. In embodiments, a motion path may be a direction path that an intelligent umbrella may physically move (e.g., a distance at an angular displacement that an intelligent umbrella and/or robotic shading system may physically move). In addition, computer-readable instructions executable by one or more processors of a mobile computing device (or an intelligent umbrella and/or robotic shading system) may also calculate and/or determine a position and/or orientation of a shade end effector (e.g., a rotation angle, an elevation angle, and/or a deployment and/or expansion distance to provide a maximum shade to an object (or person) to be shaded).

In embodiments, in step 280, computer-readable instructions executable by one or more processors of a mobile computing device (or an intelligent umbrella or robotic shading system) may communicate instructions, messages and/or commands to a robotic shading system (or directly to components and/or assemblies) to cause an intelligent umbrella and/or robotic shading system to move along the motion path to the end goal position (e.g., the instructions or messages may provide a distance and/or an angular displacement for the movement of the intelligent umbrella and/or robotic shading system (which may be relayed or communicated, for example) to wheel assemblies and/or movement controller assemblies of a base assembly to cause the movement. In embodiments, computer-readable instructions executable by one or more processors of a mobile computing device (or an intelligent umbrella or robotic shading system) may communicate instructions, messages and/or commands to a robotic shading system (or directly to components and/or assemblies) to cause assemblies and/or components to move a shade end effector to an end goal position and/or orientation and provide a large amount of shade. In embodiments, for example, these assemblies and/or components may be azimuth or rotation motor assemblies, elevation and/or hinging motor assemblies, and/or expansion or deployment motor assemblies. In embodiments, for example, the instructions may cause an intelligent umbrella to move 3 feet at a 30 degree angle from its current location and to rotate an upper portion of an intelligent umbrella 30 degrees with respect to true north with the arm expansion assembly to be 80 percent deployed in order to provide maximum shade.

Figure 3:
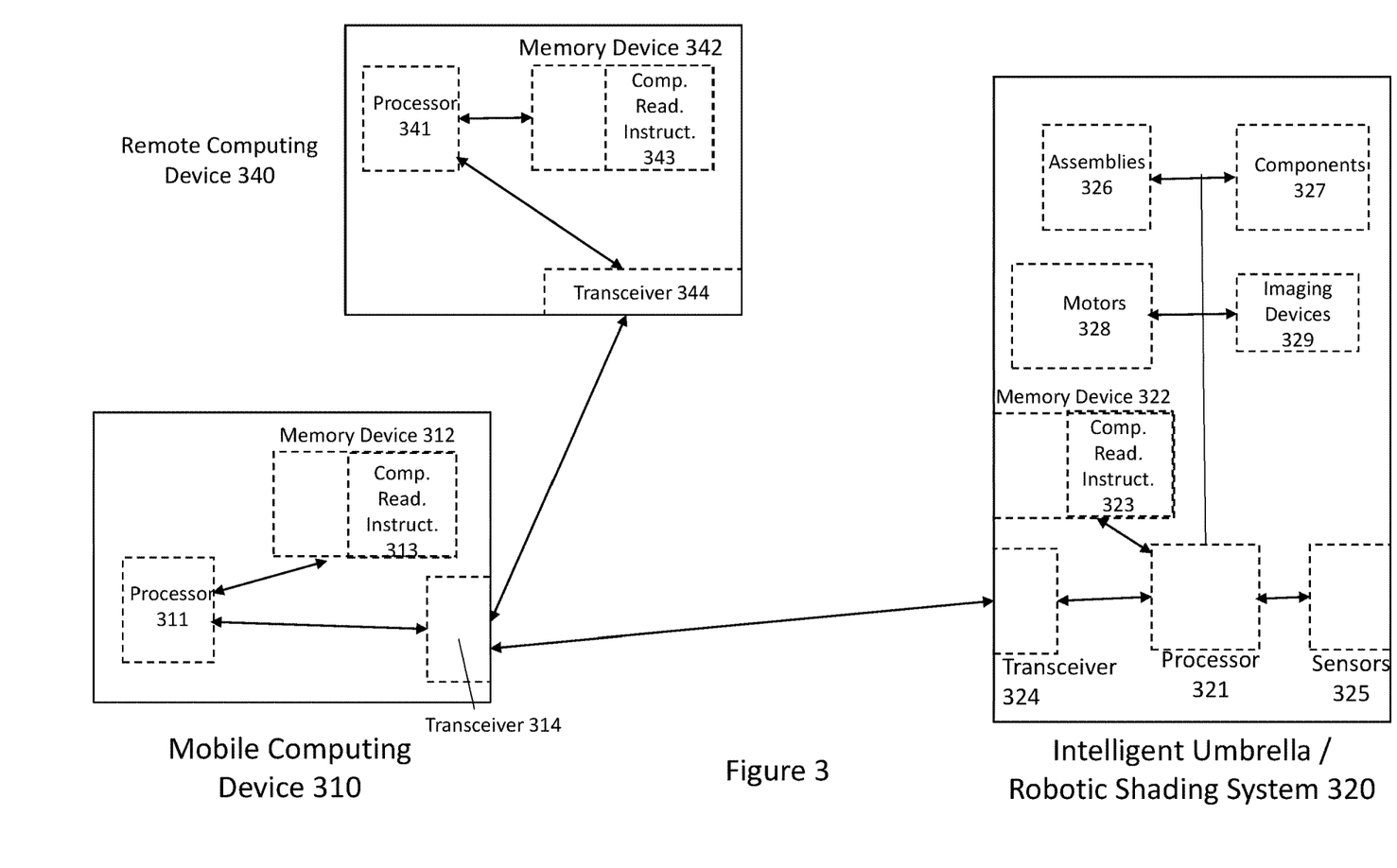
FIG. 3 illustrates a block diagram of one or more computing devices utilized in determining maximum shade according to embodiments.

FIG. 3 illustrates a block diagram of one or more computing devices utilized in determining maximum shade according to embodiments. In embodiments, a mobile computing device 310 may communicate with an intelligent umbrella and/or robotic shading system 320. In embodiments, a mobile computing device 310 may communicate with one or more remote computing devices 340. Although FIGS. 1 and 2 are described as computer-readable instructions 313 being executable by one or more processors on one or more mobile computing devices, computer-readable instructions 323 located on an intelligent umbrella/robotic shading system 320 and/or computer-readable instructions 343 located on a remote computing device 340 may also implement and perform a shading maximization process according to embodiments as described in FIGS. 1 and 2. In other words, a user or operator may initiate a mobile software application (e.g., SHADECRAFT software application) which may include a menu item or selection for determining shading maximization and/or movements made in response to a shading maximization determination and/or calculation and/or may activate a similar software application at an intelligent umbrella/robotic shading system 320 and/or a remote computing device 340. In embodiments, configuration parameters of shading devices and/or intelligent umbrellas/robotic shading systems; geographical locations and/or orientations of intelligent umbrellas/robotic shading systems; degrees of freedoms or movement possibilities of intelligent umbrellas/robotic shading systems; images and/or scans of objects; and/or locations of a light source (e.g., a sun) may be stored in one or more memory devices 312 of a mobile computing device 310, one or more memory devices 322 of an intelligent umbrella/robotic shading system 320, and/or one or more memory devices 342 of a remote computing device 340.

In embodiments, computer-readable instructions 313 may be executable by one or more processors 311 on the mobile computing device in order to communicate with one or more sensors (proximity sensors, environmental sensors, directional sensors, etc.) 325, one or more assemblies 326 (hinging assemblies, expansion assemblies, lighting assemblies, etc.), one or more components 327 (gyroscopes, accelerometers, etc.), one or more motors 328, and/or one or more imaging devices 329). In embodiments, communications between a mobile communication device 320 and/or an intelligent umbrella/robotic shading system 340 may occur utilizing one or more wireless transceivers (mobile communication device transceiver 314 and/or intelligent umbrella/robotic shading system transceiver 324). In embodiments, wireless communication transceivers 321 and 324 may operate according to PAN protocols (e.g., Bluetooth, Zigbee), WAN protocols (802.11 or WiFi), and/or cellular protocols (3G, 4G or 5G, etc.). In embodiments, wireless communication may occur via Ultra Low Energy (ULE) protocols. In embodiments, information and/or measurements may be received from one or more sensors (proximity sensors, environmental sensors, directional sensors, etc.) 325, one or more assemblies 326 (hinging assemblies, expansion assemblies, lighting assemblies, etc.), one or more components 327 (gyroscopes, accelerometers, etc.), one or more motors 328, and/or one or more imaging devices 329 in order to perform actions and/or processes described in FIGS. 1 and 2 above. In addition, computer-readable instructions 313 executable by one or more processors 311 may communicate instructions, messages, signals and/or messages to one or more sensors 325, one or more assemblies 326 (hinging assemblies, expansion assemblies, lighting assemblies, etc.), one or more components 327 (gyroscopes, accelerometers, etc.), one or more motors 328, and/or one or more imaging devices 329 in order to cause an intelligent umbrella and/or robotic shading system 320 to perform actions outlined and described in FIGS. 1 and 2.

In embodiments, a robotic umbrella includes a base assembly, a support assembly coupled to the base assembly, one or more shading assemblies coupled to the support assembly; one or more processors; one or more memory devices; and computer-readable instructions stored in the one or more memory devices. In embodiments, computer-readable instructions accessed from the one or more memory devices and executed by the one or more processors determine a geographical location of the robotic umbrella utilizing at least one of a wireless communication transceiver or a global positioning system (GPS) transceiver, or a combination thereof; and determine an orientation of a light source with respect to the robotic umbrella utilizing at least one of a compass, an accelerometer, a magnetometer or a gyroscope, or combination thereof. The robotic umbrella may also include one or more distance sensors, wherein the computer-readable instructions further executable by the one or more processors to receive measurement values from one or more distance sensors, the measurement values based on a location of an object; and calculate a distance from the robotic umbrella to the object. In embodiments, the robotic umbrella further includes an imaging device, the imaging device to capture an image of the object and communicate the image of the object to the one or more processors. The computer-readable instructions are further executable by the one or more processors to analyze the received image of the object to determine if the received image represents a human or living organism. The robotic umbrella includes a laser scanning device, where the laser scanning device generates a two-dimensional representation of the object and to communicate the two-dimensional representation of the object to the one or more processors, wherein the computer-readable instructions are further executable by the one or more processors to analyze the received two-dimensional representation of the object to determine if the received two-dimensional representation represents a human or living organism.

The computer-readable instructions in the robotic umbrella are further executable by the one or more processors to retrieve one or more robotic umbrella configurations and associated robotic umbrella configuration parameters from the one or more memory devices, the retrieved associated robotic umbrella configuration parameters identify shading capabilities of the one or more robotic umbrella configurations. The computer-readable instructions in the robotic umbrella are further executable by the one or more processors to generate one or more shading dimensions for the one or more robotic umbrella configurations, based at least in part, on the retrieved associated robotic umbrella configuration parameters. The computer-readable instructions in the robotic umbrella are further executable by the one or more processors to analyze the one or more generated shading dimensions for the one or more robotic umbrella configurations to determine a largest shading dimension and corresponding robotic umbrella configuration.

The computer-readable instructions in the robotic umbrella are further executable by the one or more processors to calculate a revised position and a revised orientation of the robotic umbrella based, at least in part, on the corresponding robotic umbrella configuration, the determined geographic location of the robotic umbrella and the determined orientation of the light source, the revised position and the revised orientation to provide a largest shading area for the object with respect to the robotic umbrella. The computer-readable instructions in the robotic umbrella are further executable by the one or more processors to generate adjustment instruction or commands, based at least in part, on the revised orientation; and communicate the generated adjustment instructions or commands to assemblies or components in the robotic umbrella to move sections or portions of the robotic umbrella in response to the generated adjustment instructions or commands.

In embodiments, the computer-readable instructions in the robotic umbrella are further executable by the one or more processors to calculate degrees of freedom measurements of the robotic umbrella, the degrees of freedom representing potential movements of the robotic umbrella and being based, at least in part, on the one or more robotic configuration parameters. In embodiments, the computer-readable instructions in the robotic umbrella to calculate one or more end effector orientation and location positions based at least in part on the calculated degrees of freedom measurements. The computer-readable instructions in the robotic umbrella are further executable by the one or more processors to retrieve obstacle or barrier information with respect to the robotic umbrella; and calculate revised degree of freedom measurements based at least in part on the retrieved obstacle or barrier information.

The computer-readable instructions in the robotic umbrella are further executable by the one or more processors to calculate configuration space values for the one or more end effector orientation and location positioned based at least in part on the one or more robotic configuration parameters. The computer-readable instructions in the robotic umbrella are further executable by the one or more processors to determine an end position and/or orientation of a shade end effector based, at least in part on, i) the determined location of the person or object; ii) the relative location of the light source with respect to the robotic umbrella; and/or iii) the configuration space values for different shade end effector positions. The computer-readable instructions in the robotic umbrella are further executable by the one or more processors to calculate a motion path from a current robotic umbrella position to the end position. The computer-readable instructions in the robotic umbrella are further executable by the one or more processors to communicate instructions and/or commands to components and/or assemblies of the robotic umbrella to move the robotic umbrella to the end position. The computer-readable instructions in the robotic umbrella are further executable by the one or more processors to calculate an end shade effector orientation. The computer-readable instructions in the robotic umbrella are further executable by the one or more processors to communicate instructions and/or commands to components and/or assemblies of the robotic umbrella to move the robotic umbrella to the end shade effector orientation.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a shading object may comprise a shading object computing device installed within or as part of a shading object, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object computing device). In the context of this specification, therefore, a special purpose computer or a similar special purpose electronic computing device (e.g., a shading object computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an intelligent, automated shading object, umbrella, and/or shading charging systems, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller. In an embodiment, a processor and/or controller may be connected to other system elements, including one or more memory devices, by a bus. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems), and/or a UNIX operating systems. Embodiments are not limited to any particular implementation and/or operating system.

The specification may refer to an intelligent shading object as an apparatus that provides shade to a user from weather elements such as sun, wind, rain, and/or hail. In embodiments, the intelligent shading object may be an automated intelligent shading object, automated intelligent umbrella, and/or automated intelligent shading charging system. The automated intelligent shading object may also be referred to as a parasol, intelligent umbrella, sun shade, outdoor shade furniture, sun screen, sun shelter, awning, sun cover, sun marquee, brolly and other similar names, which may all be utilized interchangeably in this application.

A computing device may be a server, a computer, a laptop computer, a mobile computing device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or an intelligent shading object system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, e.g., memory 1004, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Persistent storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. A robotic umbrella, comprising:
a base assembly;
a support assembly coupled to the base assembly;
one or more shading assemblies coupled to the support assembly;
one or more distance sensors;
one or more processors;
an imaging device, the imaging device to capture an image of an object and communicate the image of the object to the one or more processors;
one or more memory devices; and
computer-readable instructions stored in the one or more memory devices, accessed from the one or more memory devices and executable by the one or more processors to:

determine a geographical location of the robotic umbrella utilizing a wireless communication transceiver or a global positioning system (GPS) transceiver, or a combination thereof;

determine an orientation of a light source with respect to the robotic umbrella utilizing the determined geographic location of the robotic umbrella, a current time and a date;

receive measurement values from the one or more distance sensors, the measurement values based on a location of the object;

calculate a distance from the robotic umbrella to the object; and analyze the received image of the object to determine if the received image represents a human or living organism.

2. The robotic umbrella of claim 1, wherein the computer-readable instructions are further executable by the one or more processors to:

retrieve one or more robotic umbrella configurations and associated robotic umbrella configuration parameters from the one or more memory devices, the retrieved associated robotic umbrella configuration parameters identifying shading capabilities of the one or more robotic umbrella configurations.

3. The robotic umbrella of claim 2, wherein the computer-readable instructions are further executable by the one or more processors to:

generate one or more shading dimensions for the one or more robotic umbrella configurations, based at least in part, on the retrieved associated robotic umbrella configuration parameters.

4. The robotic umbrella of claim 3, wherein the computer-readable instructions are further executable by the one or more processors to:

analyze the one or more generated shading dimensions for the one or more robotic umbrella configurations to determine a largest shading dimension and corresponding robotic umbrella configuration.

5. The robotic umbrella of claim 4, wherein the computer-readable instructions are further executable by the one or more processors to:

calculate a revised position and a revised orientation of the robotic umbrella based, at least in part, on the corresponding robotic umbrella configuration, the determined geographic location of the robotic umbrella and the determined orientation of the light source, the revised position and the revised orientation to provide a largest shading area for the object with respect to the robotic umbrella.

6. The robotic umbrella of claim 5, wherein the computer-readable instructions are further executable by the one or more processors to:

generate adjustment instructions or commands, based at least in part, on the revised orientation; and communicate the generated adjustment instructions or commands to the base assembly, the support assembly or the one or more shading assemblies or components in the robotic umbrella to move sections or portions of the robotic umbrella in response to the generated adjustment instructions or commands.

7. The robotic umbrella of claim 2, wherein the computer-readable instructions are further executable by the one or more processors to:

calculate degrees of freedom measurements of the robotic umbrella, the degrees of freedom representing potential movements of the robotic umbrella and being based, at least in part, on the one or more robotic configuration parameters.

8. The robotic umbrella of claim 7, wherein the computer-readable instructions are further executable by the one or more processors to:

calculate one or more shade end effector orientation and location positions based, at least in part, on the calculated degrees of freedom measurements.

9. The robotic umbrella of claim 8, wherein the computer-readable instructions are further executable by the one or more processors to:

calculate configuration space values for the one or more end effector orientation and location positions based, at least in part, on the one or more robotic configuration parameters.

10. The robotic umbrella of claim 8, wherein the computer-readable instructions are further executable by the one or more processors to:

determine an end position and/or orientation of the shade end effector based, at least in part on, i) the determined location of the person or object; ii) the relative location of the light source with respect to the robotic umbrella; and/or iii) the configuration space values for different shade end effector location and orientation positions.

11. The robotic umbrella of claim 10, wherein the computer-readable instructions are further executable by the one or more processors to calculate a motion path from a current robotic umbrella position to the end position.

12. The robotic umbrella of claim 10, wherein the computer-readable instructions are further executable by the one or more processors to communicate instructions and/or commands to components and/or the base assembly, the support assembly or the one or more shading assemblies of the robotic umbrella to move the robotic umbrella along a motion path to the end position.

13. The robotic umbrella of claim 7, wherein the computer-readable instructions are further executable by the one or more processors to:

retrieve obstacle or barrier information with respect to the robotic umbrella; and calculate revised degree of freedom measurements based, at least in part, on the retrieved obstacle or barrier information.

14. A robotic umbrella, comprising:

a base assembly;

a support assembly coupled to the base assembly;

one or more shading assemblies coupled to the support assembly;

one or more distance sensors;

one or more processors;

a laser scanning device, the laser scanning device to generate a two-dimensional representation of an object and to communicate the two-dimensional representation of the object to the one or more processors;

one or more memory devices; and computer-readable instructions stored in the one or more memory devices, accessed from the one or more memory devices and executable by the one or more processors to:

determine a geographical location of the robotic umbrella utilizing a wireless communication transceiver or a global positioning system (GPS) transceiver, or a combination thereof;

determine an orientation of a light source with respect to the robotic umbrella utilizing the determined geographic location of the robotic umbrella, a current time and a date;
receive measurement values from the one or more distance sensors, the measurement values based on a location of the object;
calculate a distance from the robotic umbrella to the object; and
analyze the received two-dimensional representation of the object to determine if the received two-dimensional representation represents a human or living organism.

\* \* \* \* \*